(12) United States Patent
Wang et al.

(10) Patent No.: US 11,092,829 B2
(45) Date of Patent: Aug. 17, 2021

(54) DISPLAY DEVICE AND DISPLAY METHOD THEREOF

(71) Applicants: FUZHOU BOE OPTOELECTRONICS TECHNOLOGY CO., LTD., Fuzhou (CN); BOE TECHNOLOGY GROUP CO., LTD., Beijing (CN)

(72) Inventors: Jin Wang, Beijing (CN); Xi Chen, Beijing (CN); Zongxiang Li, Beijing (CN); Jiamin Liao, Beijing (CN); Wenchang Tao, Beijing (CN); Zhendian Wu, Beijing (CN); Dahai Li, Beijing (CN); Changhong Shi, Beijing (CN); Zuwen Liu, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/649,441

(22) PCT Filed: May 9, 2019

(86) PCT No.: PCT/CN2019/086113
§ 371 (c)(1),
(2) Date: Mar. 20, 2020

(87) PCT Pub. No.: WO2020/019825
PCT Pub. Date: Jan. 30, 2020

(65) Prior Publication Data
US 2020/0271970 A1    Aug. 27, 2020

(30) Foreign Application Priority Data

Jul. 23, 2018 (CN) .......................... 201810813354.6

(51) Int. Cl.
G02F 1/133 (2006.01)
G02F 1/1343 (2006.01)
G02F 1/1368 (2006.01)

(52) U.S. Cl.
CPC ........ *G02F 1/13306* (2013.01); *G02F 1/1368* (2013.01); *G02F 1/134309* (2013.01); *G02F 2203/12* (2013.01)

(58) Field of Classification Search
None
See application file for complete search history.

(56) References Cited

U.S. PATENT DOCUMENTS 7,570,320 B1   8/2009   Anderson et al.
7,982,812 B2   7/2011   Rho et al.
(Continued)

FOREIGN PATENT DOCUMENTS

CN   101320133 A   12/2008
CN   102033413 A   4/2011
(Continued)

OTHER PUBLICATIONS

Machine translation of CN 106154798 (Guan Feng et al.) (Year: 2016).*
(Continued)

*Primary Examiner* — James A Dudek
(74) *Attorney, Agent, or Firm* — The Webb Law Firm

(57) ABSTRACT

The present disclosure relates to a display device and a display method thereof. The display device includes: a plurality of sub-pixels each including a light emitting element and a liquid crystal spatial light modulator, wherein the liquid crystal spatial light modulator is located on a light emission side of the light emitting element, and a phase of light emitted by the light emitting element is modulatable after passing through the liquid crystal spatial light modu-
(Continued)

lator; a first control circuit configured to control a light emission intensity and chromaticity of the light emitting element; and a second control circuit configured to control deflection of liquid crystal in the liquid crystal spatial light modulator so as to modulate the phase.

13 Claims, 3 Drawing Sheets

(56) References Cited

U.S. PATENT DOCUMENTS

| | | | |
|---|---|---|---|
| 2008/0304151 A1 | 12/2008 | Ura | |
| 2009/0091689 A1 | 4/2009 | Rho et al. | |
| 2014/0340724 A1 | 11/2014 | Won et al. | |
| 2016/0295178 A1* | 10/2016 | Damberg | H04N 9/3152 |
| 2018/0239150 A1* | 8/2018 | Yoshida | G02B 6/005 |
| 2018/0299684 A1 | 10/2018 | Zhang et al. | |
| 2019/0196403 A1 | 6/2019 | Guan et al. | |

FOREIGN PATENT DOCUMENTS

| | | |
|---|---|---|
| CN | 102116940 A | 7/2011 |
| CN | 104360536 A | 2/2015 |
| CN | 105093674 A | 11/2015 |
| CN | 106154798 A | 11/2016 |
| CN | 106842371 A | 6/2017 |
| CN | 107924061 A | 4/2018 |
| CN | 108020977 A | 5/2018 |
| EP | 2482117 A1 | 8/2012 |

OTHER PUBLICATIONS

Kozma et al., "Spatial Filtering for Detection of Signals Submerged in Noise", Applied Optics, Apr. 1965, pp. 387-392, vol. 4, No. 4.

* cited by examiner

DISPLAY DEVICE AND DISPLAY METHOD THEREOF

CROSS-REFERENCE TO RELATED APPLICATIONS

This application is the United States national phase of International Application No. PCT/CN2019/086113 filed May 9, 2019, and claims priority to Chinese Patent Application No. 201810813354.6 filed Jul. 23, 2018, the disclosures of which are hereby incorporated by reference in their entirety.

BACKGROUND OF THE INVENTION

Field of the Invention

The present disclosure relates to the technical field of display, and in particular, to a display device and a display method thereof.

Description of Related Art

With the rapid development of display technologies, holographic displays are receiving more and more attention because they can completely retain information of objects, such that scenes viewed by human eyes are closer to reality without the need of wearing any equipment.

SUMMARY OF THE INVENTION

According to a first aspect of the embodiments of the present disclosure, there is provided a display device comprising: a plurality of sub-pixels each comprising a light emitting element and a liquid crystal spatial light modulator, wherein the liquid crystal spatial light modulator is located on a light emission side of the light emitting element, and a phase of light emitted by the light emitting element can be modulated after passing through the liquid crystal spatial light modulator; a first control circuit configured to control a light emission intensity and chromaticity of the light emitting element; and a second control circuit configured to control deflection of liquid crystal in the liquid crystal spatial light modulator so as to modulate the phase.

In some embodiments, the first control circuit is configured to control the light emission intensity and chromaticity of the light emitting element in accordance with light intensity and chromaticity information in a holographic display signal.

In some embodiments, the first control circuit comprises a first switching circuit configured to control on/off switching of the light emitting element.

In some embodiments, the first switching circuit comprises a first thin film transistor connected to the light emitting element through a first contact doubling as one electrode of the light emitting element.

In some embodiments, the second control circuit is configured to control the deflection of the liquid crystal in accordance with phase information in the holographic display signal.

In some embodiments, the second control circuit comprises: a second switching circuit configured to control on/off switching of the liquid crystal spatial light modulator.

In some embodiments, the second switching circuit comprises a second thin film transistor connected to the liquid crystal spatial light modulator through a second contact.

In some embodiments, control of the first control circuit is synchronized with that of the second control circuit.

In some embodiments, the liquid crystal spatial light modulator comprises a first electrode and a second electrode disposed opposite each other, the liquid crystal being located between the first electrode and the second electrode.

In some embodiments, the first electrode doubles as one electrode of the light emitting element.

In some embodiments, the liquid crystal spatial light modulator is a transmissive spatial phase modulator.

According to a second aspect of the embodiments of the present disclosure, there is provided a display method of the foregoing display device, comprising: controlling the light emission intensity and chromaticity of the light emitting element; and controlling the deflection of the liquid crystal in the liquid crystal spatial light modulator.

In some embodiments, the light emission intensity and chromaticity of the light emitting element is controlled in accordance with light intensity and chromaticity information in a holographic display signal.

In some embodiments, the deflection of the liquid crystal is controlled in accordance with phase information in the holographic display signal.

In some embodiments, control of the light emitting element is synchronized with that of the liquid crystal spatial light modulator.

In some embodiments, the display method further comprises: calculating a light field distribution of object light waves on a holographic surface; and converting the light field distribution into light intensity, chromaticity and phase distribution of a hologram, thereby obtaining a holographic display signal including light intensity and chromaticity information and phase information.

In some embodiments, that controlling the deflection of the liquid crystal in accordance with phase information in the holographic display signal comprises: calculating the deflection of the liquid crystal in the liquid crystal spatial light modulator in accordance with the phase distribution; and calculating a voltage required by the deflection of the liquid crystal in the liquid crystal spatial light modulator.

According to a third aspect of the embodiments of the present disclosure, there is provided a display device comprising: a memory; and a processor coupled to the memory, the processor configured to perform the display method according to any of the foregoing embodiments based on instructions stored in the memory.

According to a fourth aspect of the embodiments of the present disclosure, there is provided a computer-readable storage medium on which a computer program is stored, the program, when executed by a processor, implementing the display method according to any of the foregoing embodiments.

Other features of the present disclosure and advantages thereof will become apparent from the following detailed description of the embodiments of the present disclosure with reference to the accompanying drawings.

BRIEF DESCRIPTION OF THE DRAWINGS

The accompanying drawings which constitute a part of the specification describe the embodiments of this disclosure, and together with the description, serve to explain the principle of this disclosure.

This disclosure can be understood more clearly with reference to the accompanying drawings according to the following detailed description, in which.

It should be noted that, the dimensions of the parts shown in the accompanying drawings are not drawn in accordance with actual proportional relationships. In addition, identical or similar reference numerals represent identical or similar composite parts.

DESCRIPTION OF THE INVENTION

The various exemplary embodiments of this disclosure are now described in detail with reference to the accompanying drawings. The description of the exemplary embodiment is merely illustrative and by no means serves as any restriction to this disclosure and its application or use. This disclosure can be implemented in many different forms and is not limited to the embodiments described here. These embodiments are provided in order to make this disclosure thorough and complete, and to fully express the scope of this disclosure to a person skilled in the art. It should be noted that, unless otherwise specified, the relative arrangements of the components and steps described in these embodiments should be interpreted as merely illustrative but not restrictive.

The use of "first," "second," and similar words in this disclosure is not intended to indicate any order, quantity, or importance, but rather is used to distinguish one element from another. The word "comprising" or the like means that the elements preceding the word encompass the elements listed after the word and do not exclude the possibility that other elements are also encompassed. "upper", "lower", "left", "right", and the like are used only to indicate relative position relations, and when an absolute position of the object being described is changed, the relative position relations may also be changed accordingly.

In the present disclosure, when a specific element is described as being positioned between a first element and a second element, there may or may not be an intervening element between the specific element and the first element or the second element.

All terms (including technical terms or scientific terms) that are used in this disclosure have the same meanings as those understood by a person of ordinary skill in the field to which this disclosure pertains, unless otherwise specifically defined. It should also be understood that, terms defined in common dictionaries should be interpreted as having meanings consistent with their meanings in the context of the related art, rather than being interpreted in an idealized or extremely formalized sense, unless expressly defined here.

The technologies, methods and apparatuses known to those skilled in the related fields may not be discussed in detail, but where appropriate, the techniques, methods and apparatuses should be considered as part of the specification.

The inventors found out through research that: the related holographic display technology is difficult to realize and high in cost.

In view of that, the present disclosure proposes a technical solution capable of achieving portable and low-cost holographic display.

Figure 1:
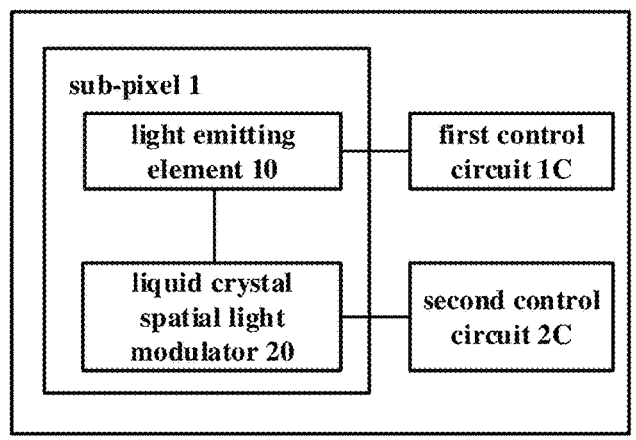
FIG. 1 is a block diagram illustrating a display device according to an embodiment of the present disclosure.

FIG. 1 is a block diagram illustrating a display device according to an embodiment of the present disclosure.

As shown in FIG. 1, the display device comprises a plurality of sub-pixels 1. Each sub-pixel comprises a light emitting element 10 and a liquid crystal spatial light modulator (SLM) 20.

The light emitting element 10 may be of different types according to actual needs. In some embodiments, the light emitting element is an Organic Light Emitting Diode (OLED), a Quantum Light Emitting Diode (QLED), or a micro Light Emitting Diode (micro LED).

The liquid crystal spatial light modulator 20 is located on a light emission side of the light emitting element 10, and a phase of light emitted from the light emitting element 10 can be modulated after passing through the liquid crystal spatial light modulator 20.

The liquid crystal in the liquid crystal spatial light modulator 20 has special optical properties. The ellipsoidal morphology of the liquid crystal molecules gives the liquid crystal molecules birefringent properties to light. Under the action of electric field, the liquid crystal molecules rotate, that is, the arrangement of the liquid crystal molecules changes, and the change in the arrangement of the liquid crystal molecules causes the refractive index along the optical axis to change, and the change in the refractive index causes an optical path of the polarized light to change, so that the polarized light has different phase delays. Thus, the phase can be modulated after the light passes through the liquid crystal spatial light modulator. In some embodiments, the liquid crystal spatial light modulator is a transmissive spatial phase modulator.

As shown in FIG. 1, the display device further comprises a first control circuit 1C and a second control circuit 2C.

The first control circuit 1C is configured to control the light emission intensity and chromaticity of the light emitting element 10. For example, the first control circuit 1C may control the light emission intensity and chromaticity of the light emitting element 10 in accordance with light intensity and chromaticity information of a hologram display signal.

In some embodiments, the first control circuit comprises: a first integrated circuit configured to determine the light emission intensity and chromaticity of the light emitting element in accordance with the light intensity and chromaticity information in the holographic display signal; and a first switching circuit configured to control on/off switching of the light emitting element.

The second control circuit 2C is configured to control deflection of the liquid crystal in the liquid crystal spatial light modulator 20 so as to modulate the phase of the light passing through the liquid crystal spatial light modulator 20. For example, the second control circuit 2C may control the deflection of the liquid crystal in the liquid crystal spatial light modulator 20 in accordance with the phase information in the holographic display signal.

In some embodiments, the second control circuit comprises: a second integrated circuit configured to determine the deflection of the liquid crystal in the liquid crystal spatial light modulator in accordance with the phase information in the holographic display signal; and a second switching circuit configured to control on/off switching of the liquid crystal spatial light modulator.

In some embodiments, the control of the first control circuit is synchronized with that of the second control circuit. For example, the first switching circuit and the second switching circuit may be controlled to switch synchronously. For a display device, synchronization may cause a display screen to display two pictures simultaneously, of which one picture displays a light intensity and chromaticity diagram of object light waves, for example, display a color image by utilizing color mixing of three primary colors; and the other picture displays a phase hologram of the object light waves, thereby realizing reconstruction of a holographic image.

Figure 2:
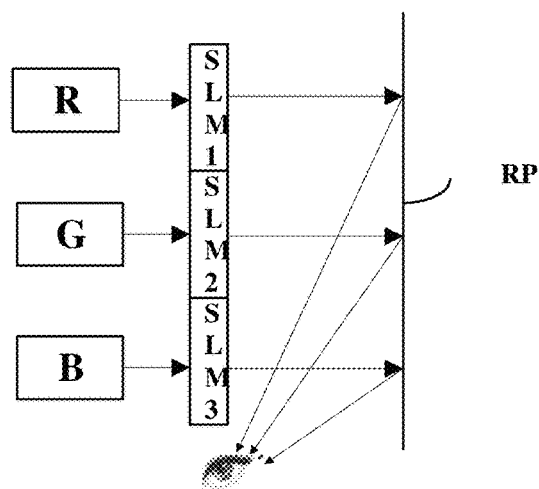
FIG. 2 is a schematic diagram illustrating a holographic display according to an embodiment of the present disclosure.

FIG. 2 is a schematic diagram illustrating a holographic display according to an embodiment of the present disclosure.

As shown in FIG. 2, three primary colors R, G, B pass through the liquid crystal spatial light modulators SLM1, SLM2, and SLM3, respectively, and after being phase-modulated, they are incident onto a reconstruction plane RP (i.e., the screen of the display device) and presented to the eyes.

It is to be understood that in case where the phase hologram is not input but only the light intensity and chromaticity diagram is input, for example, in case where the second switching circuit is not switched on but only the first switching circuit is switched on, a non-holographic display, i.e., a normal two-dimensional display can be realized. Therefore, the display device according to the present disclosure has both the holographic display function and the normal two-dimensional display function, and thus realizes function diversification.

In the above embodiments, by modulating the phase of the light emitted from the light emitting element using the liquid crystal spatial light modulator, a portable and low-cost holographic display can be realized.

Figure 3:
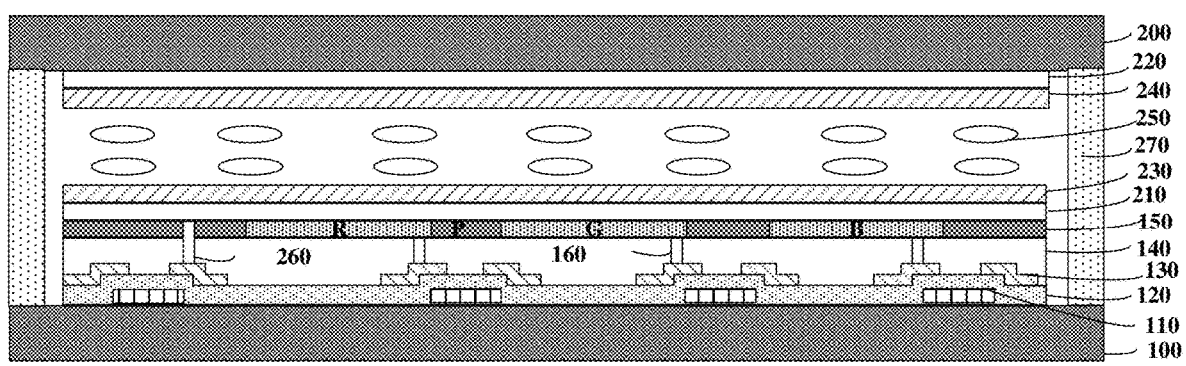
FIG. 3 is a schematic diagram illustrating a structure of a display device according to an embodiment of the present disclosure.

FIG. 3 is a schematic view illustrating a structure of a display device according to an embodiment of the present disclosure. FIG. 3 shows a schematic structural diagram of the liquid crystal spatial light modulator and the light-emitting element, and also a structure of the switching circuits of the first and second control circuits, but does not show a structure of the integrated circuits.

As shown in FIG. 3, the light emitting element, the first and second switching circuits are formed on a first substrate 100.

In some embodiments, the first switching circuit and the second switching circuit are similar in structure. For example, as shown in FIG. 3, gate electrode 110, active layer 120, and source/drain electrodes 130 constitute four switching transistors, i.e., four thin film transistors (TFTs). The four TFTs are separated by an insulating layer 140. The leftmost one TFT in FIG. 3 corresponds to the second switching circuit, and the remaining three TFTs correspond to the first switching circuit.

In some embodiments, a material of the first substrate is glass. The gate electrode 110 may use a metal stack MoNb/Cu. The active layer may use a-Si/n$^+$ a-Si. The source/drain electrodes may use a metal stack Mo/Al/Mo. The insulating layer may use SiNx.

As shown in FIG. 3, a light emitting layer 150 is located over the TFT. The light emitting layer 150 comprises light emitting layers R, G, B of different colors separated by a pixel defining layer P. The light emitting element may comprise any one of a red light emitting layer R, a green light emitting layer G, and a blue light emitting layer B for each sub-pixel. The material of the light emitting layer depends on the type of the light emitting element. For example, in case where the light-emitting element is an OLED, the material of the light-emitting layer is organic light-emitting material. One electrode of the light emitting element is served by a first electrode 210, and the other electrode thereof is served by a first contact 160.

As shown in FIG. 3, each SLM comprises: a first electrode 210 and a second electrode 220, a first alignment layer 230 and a second alignment layer 240, which are disposed opposite to each other, respectively; and liquid crystal 250 between the first alignment layer 230 and the second alignment layer 240.

The first electrode 210 is located over the first substrate 100. As described above, the first electrode 210 also doubles as one electrode of the light-emitting element. The second electrode 220 is located over the second substrate 200. In some embodiments, the first and second electrodes are transparent electrodes, such as Indium Tin Oxide (ITO) electrodes.

The first alignment layer 230 and the second alignment layer 240 are located over the first substrate and the second substrate 100 and 220, respectively, and cover the first electrode 210 and the second electrode 220, respectively. The first alignment layer 230 and the second alignment layer 240 are located at two sides of the liquid crystal 250, respectively, to guide the alignment direction of the liquid crystal molecules.

In some embodiments, by opposing the first substrate 100 and the second substrate 200, i.e., opposing the first alignment layer 230 over the first substrate 100 and the second alignment layer 240 over the second substrate 200, and injecting the liquid crystal 250 between the two substrates, and then disposing a sealing member 270 (e.g., a frame sealing glue) at the periphery thereof, the display device shown in FIG. 3 can be formed.

As shown in FIG. 3, the three TFTs of the first switching circuit are connected to the light emitting layers R, G, B through the first contact 160, respectively, for controlling on/off switching of the light emitting elements. One TFT of the second switching circuit is connected to the first electrode 210 through a second contact 260 for controlling on/off switching of the SLM.

Figure 4:
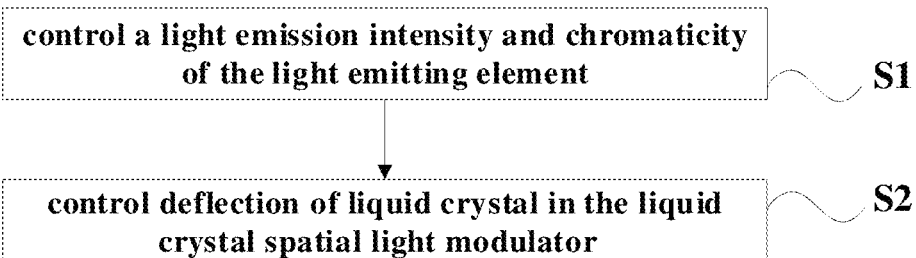
FIG. 4 is a flowchart illustrating a display method of a display device according to an embodiment of the present disclosure.

FIG. 4 is a flowchart illustrating a display method of a display device according to an embodiment of the present disclosure.

As shown in FIG. 4, the display method comprises: step S1 of controlling the light emission intensity and chromaticity of the light emitting element; and step S2 of controlling the deflection of the liquid crystal in the liquid crystal spatial light modulator. As described above, the light emission intensity and chromaticity of the light emitting element can be controlled in accordance with the light intensity and chromaticity information in the holographic display signal. The deflection of the liquid crystal may also be controlled in accordance with the phase information in the holographic display signal.

It should be understood that the steps S1 and S2 may be executed in different manners according to actual needs, so as to realize different display functions.

In some embodiments, for example in the case of holographic display, control of the light emitting element is synchronized with that of the liquid crystal spatial light modulator. For example, the first switching circuit and the second switching circuit may be controlled simultaneously, such that they are switched synchronously, i.e. switched on simultaneously or switched off simultaneously.

In other embodiments, for example in the case of normal two-dimensional display, the control of the light emitting element is not synchronized with the control of the liquid crystal spatial light modulator. As previously described, only the first switching circuit may be switched on, without switching on the second switching circuit (or switching off the second switching circuit). Thereby, only a color image is displayed on the display screen without displaying the phase hologram, thereby realizing normal two-dimensional display.

In the above embodiments, different display functions can be realized by using different control modes for the display device.

In some embodiments, the display method of the display device further comprises a step of obtaining a holographic display signal.

Figure 5A:
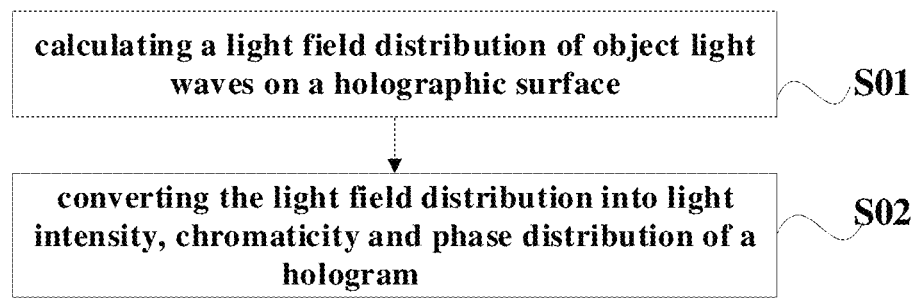
FIG. 5A is a flowchart illustrating a display method of a display device according to another embodiment of the present disclosure.

FIG. 5A is a flowchart illustrating a display method of a display device according to another embodiment of the present disclosure. Specifically, FIG. 5A shows an exemplary control flow for obtaining a holographic display signal.

As shown in FIG. 5A, obtaining a holographic display signal comprises: step S01 of calculating a light field distribution of object light waves on a holographic surface; and step S02 of converting the light field distribution into light intensity, chromaticity and phase distribution of a hologram, thereby obtaining a holographic display signal including light intensity and chromaticity information and phase information.

In the step S01, the calculation of the light field distribution may be based on the acquired object light information of real objects, and may also be based on mathematical descriptions of object waves of virtual objects. In some embodiments, the light field distribution of the object light waves on the holographic surface may be calculated through a spectral transmission equation.

In the step S02, the light intensity, chromaticity, and phase of the light may be obtained by using an optical interference method, for example, by converting the light field distribution into the light intensity, chromaticity, and phase distribution of the hologram by means of interference of the reference light with the object light. In other embodiments, the light field distribution on the holographic surface may be converted into the light intensity, chromaticity and phase distribution of the hologram by means of computer encoding.

Figure 5B:
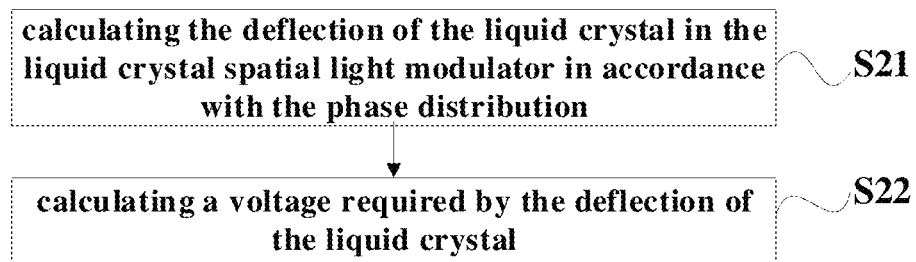
FIG. 5B is a flowchart illustrating a display method of a display device according to still another embodiment of the present disclosure.

FIG. 5B is a flowchart illustrating a display method of a display device according to still another embodiment of the present disclosure. In particular, FIG. 5B illustrates an exemplary control flow for controlling the deflection of the liquid crystal according to the phase information in the holographic display signal.

As shown in FIG. 5B, the controlling the deflection of the liquid crystal comprises: step S21 of calculating the deflection of the liquid crystal in the liquid crystal spatial light modulator in accordance with the phase distribution; and step S22 of calculating a voltage required for the deflection of the liquid crystal in the liquid crystal spatial light modulator.

In the step S21, the deflection of the liquid crystal in the liquid crystal spatial light modulator may be calculated in accordance with the phase distribution by using a correspondence between a phase retardation of the light passing through the liquid crystal and a deflection distribution of the liquid crystal.

In the step S22, a voltage required for the deflection of the liquid crystal is calculated from a correspondence between a deflection angle of the liquid crystal and a voltage across the two electrodes (the first electrode 210 and the second electrode 220 shown in FIG. 3) of the liquid crystal spatial light modulator. It will be appreciated that a magnitude of the voltage required to deflect the same angle may be different for liquid crystal molecules of different materials.

In this way, it can be calculated how much deflection voltage is required to be applied to the liquid crystal corresponding to each sub-pixel to obtain the required phase change or retardation. Based on this, the phase distribution can be loaded to the liquid crystal spatial light modulator in a gray scale pattern.

It should be understood that each step in the aforementioned display method can be implemented by a processor, and can be implemented by any one of software, hardware, firmware, or a combination thereof. It will also be appreciated that the processor may be located in the display device, or in another device electrically connected to the display device, provided that it can output the holographic display signal to the display device as required.

Figure 6:
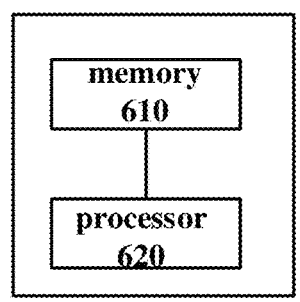
FIG. 6 is a block diagram illustrating a display device according to yet another embodiment of the present disclosure.

FIG. 6 is a block diagram illustrating a display device according to still another embodiment of the present disclosure.

As shown in FIG. 6, the display device comprises: a memory 610 and a processor 620 coupled to the memory 610. The memory 610 is used for storing instructions for executing the corresponding embodiments of the display method. The processor 620 is configured to perform the display method in any of the embodiments of the present disclosure based on the instructions stored in the memory 610.

In some embodiments, the display device may be: any product or component with a display function, such as a mobile phone, a tablet computer, a television, a display, a notebook computer, a digital photo frame, a navigator and the like.

In addition to the display method and device, the embodiments of the disclosure may take the form of a computer program product embodied on one or more non-volatile storage media containing computer program instructions. Accordingly, the embodiments of the present disclosure further comprise a computer-readable storage medium having stored thereon computer instructions, which when executed by a processor, implement the display method in any of the foregoing embodiments.

Figure 7:
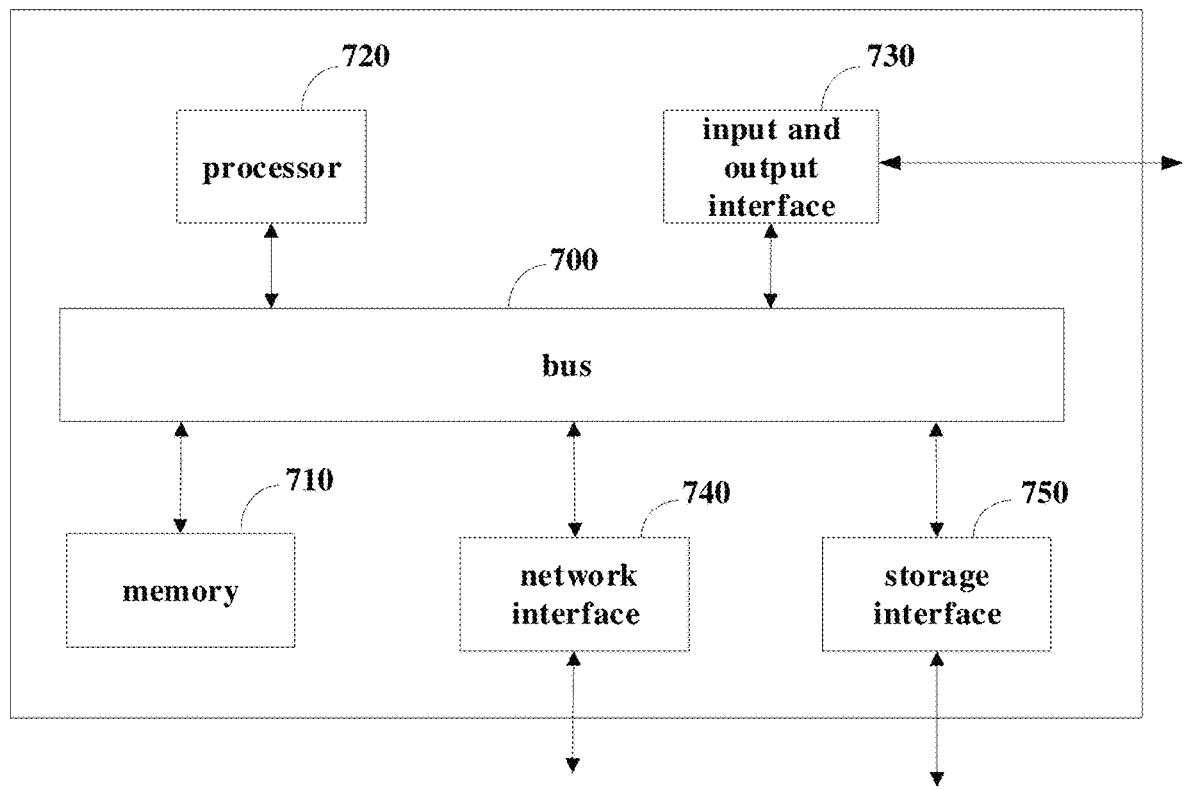
FIG. 7 is a block diagram illustrating a computer system for implementing an embodiment of the present disclosure.

FIG. 7 is a block diagram illustrating a computer system for implementing an embodiment of the present disclosure.

As shown in FIG. 7, the computer system may take the form of a general purpose computing device. The computer system comprises a memory 710, a processor 720 and a bus 700 that connects the various system components.

The memory 710 can include, for example, system memory, non-volatile storage media, and so on. The system memory, for example, is stored with operating systems, applications, boot loaders, and other programs. The system memory can include volatile storage medium, such as random access memory (RAM) and/or cache memory. The non-volatile storage medium, for example, stores instructions of corresponding embodiments that perform the display method. The non-volatile storage medium includes, but is not limited to, disk memory, optical memory, flash memory, and so on.

The processor 720 can be implemented using universal processors, digital signal processors (DSPS), application-specific integrated circuits (ASIC), field programmable gate arrays (FPGAS), or other programmable logic devices, discrete hardware components such as discrete gates or transistors. Accordingly, each module such as judging module and determining module, can be implemented through the instructions of performing the corresponding steps in the memory by the Central Processing Unit (CPU), or through dedicated circuits that perform the corresponding steps.

The bus 700 can adopt any bus structure in a variety of bus structures. For example, the bus structure includes, but is not limited to, the Industrial Standard Architecture (ISA) bus, the Microchannel Architecture (MCA) bus, and the Peripheral Component Interconnect (PCI) bus.

The computer system can also include an input and output interface 730, a network interface 740, a storage interface 750 and so on. These interfaces 730, 740, 750, and the memory 710 and the processor 720 can be connected with each other via the bus 700. The input and output interface 730 can provide a connection interface for an input and output device such as display, mouse, keyboard. The network Interface 740 provides a connection interface for various networked devices. The storage interface 750 provides a connection interface for external storage devices such as floppy disks, USB drives, and SD cards.

So far, the various embodiments of this disclosure have been described in detail. In order to avoid shielding the idea of this disclosure, some of the details well known in the art are not described. Those skilled in the art can fully understand how to carry out the technical solutions disclosed herein according to the above description.

Although some specific embodiments of this disclosure have been described in detail by way of examples, those skilled in the art should understand that the above examples are for illustrative purposes only, but not for limiting the scope of this disclosure. Those skilled in the art should understand that the above embodiments can be modified or some technical features can be equivalently replaced without departing from the scope and spirit of this disclosure. The scope of this disclosure is limited by the attached claims.

What is claimed is:

1. A display device comprising:
a plurality of sub-pixels each comprising a light emitting element and a liquid crystal spatial light modulator, wherein the liquid crystal spatial light modulator is located on a light emission side of the light emitting element, and configured to modulate a phase of light emitted from the light emitting element and passing through the liquid crystal spatial light modulator, and the liquid crystal spatial light modulator comprises a first electrode doubling as one electrode of the light emitting element and a second electrode disposed opposite to each other, the liquid crystal being located between the first electrode and the second electrode;
a first control circuit configured to control a light emission intensity and chromaticity of the light emitting element, wherein the first control circuit comprises a first switching circuit configured to control on/off switching of the light emitting element, the first switching circuit comprising a first thin film transistor connected to the light emitting element through a first contact doubling as the other electrode of the light emitting element; and
a second control circuit configured to control deflection of liquid crystal in the liquid crystal spatial light modulator so as to modulate the phase.

2. The display device according to claim 1, wherein the first control circuit is configured to control the light emission intensity and chromaticity of the light emitting element in accordance with light intensity and chromaticity information in a holographic display signal.

3. The display device according to claim 2, wherein the second control circuit is configured to control the deflection of the liquid crystal in accordance with phase information in the holographic display signal.

4. The display device according to claim 3, wherein the second control circuit comprises a second switching circuit configured to control on/off switching of the liquid crystal spatial light modulator.

5. The display device according to claim 4, wherein the second switching circuit comprises a second thin film transistor connected to the liquid crystal spatial light modulator through a second contact.

6. The display device according to claim 3, wherein control of the first control circuit is synchronized with control of the second control circuit.

7. The display device according to claim 1, wherein the liquid crystal spatial light modulator is a transmissive spatial phase modulator.

8. A display method of the display device, the display device comprising:
a plurality of sub-pixels each comprising a light emitting element and a liquid crystal spatial light modulator, wherein the liquid crystal spatial light modulator is located on a light emission side of the light emitting element, and a phase of light emitted from the light emitting element is modulatable after passing through the liquid crystal spatial light modulator, and the liquid crystal spatial light modulator comprises a first electrode doubling as one electrode of the light emitting element and a second electrode disposed opposite to each other, the liquid crystal being located between the first electrode and the second electrode;
a first control circuit configured to control a light emission intensity and chromaticity of the light emitting element, wherein the first control circuit comprises a first switching circuit configured to control on/off switching of the light emitting element, the first switching circuit comprising a first thin film transistor connected to the light emitting element through a first contact doubling as the other electrode of the light emitting element; and
a second control circuit configured to control deflection of liquid crystal in the liquid crystal spatial light modulator so as to modulate the phase;
wherein the display method comprises:
controlling the light emission intensity and chromaticity of the light emitting element; and
controlling the deflection of the liquid crystal in the liquid crystal spatial light modulator.

9. The display method according to claim 8, wherein:
the light emission intensity and chromaticity of the light emitting element is controlled in accordance with light intensity and chromaticity information in a holographic display signal;
the deflection of the liquid crystal is controlled in accordance with phase information in the holographic display signal; and
control of the light emitting element is synchronized with control of the liquid crystal spatial light modulator.

10. The display method according to claim 9, further comprising:
- calculating a light field distribution of object light waves on a holographic surface; and
- converting the light field distribution into light intensity, chromaticity and phase distribution of a hologram, thereby obtaining the holographic display signal comprising light intensity and chromaticity information and phase information.

11. The display method according to claim 10, wherein the controlling the deflection of the liquid crystal in accordance with the phase information in the holographic display signal comprises:
- calculating the deflection of the liquid crystal in the liquid crystal spatial light modulator in accordance with the phase distribution; and
- calculating a voltage required by the deflection of the liquid crystal in the liquid crystal spatial light modulator.

12. A display device comprising:
- a memory; and
- a processor coupled to the memory, the processor configured to perform the display method according to claim 8 based on instructions stored in the memory.

13. A non-transient computer-readable storage medium on which a computer program is stored, the program, when executed by a processor, implementing the display method according to claim 8.

* * * * *